US012700553B2

(12) United States Patent (10) Patent No.: US 12,700,553 B2
Klier (45) Date of Patent: Aug. 4, 2026

(54) HALF-BRIDGE CIRCUIT ARRANGEMENT AND METHOD FOR ACTUATION

(71) Applicant: SEMIKRON DANFOSS ELEKTRONIK GMBH & CO. KG, Nuremberg (DE)

(72) Inventor: Johannes Klier, Amberg, DE (US)

(73) Assignee: SEMIKRON DANFOSS ELEKTRONIK GMBH & CO. KG, Nuremberg (DE)

( * ) Notice: Subject to any disclaimer, the term of this patent is extended or adjusted under 35 U.S.C. 154(b) by 261 days.

(21) Appl. No.: 18/671,888

(22) Filed: May 22, 2024

(65) Prior Publication Data

US 2024/0395475 A1     Nov. 28, 2024

(30) Foreign Application Priority Data

May 24, 2023     (DE) ..................... 10 2023 113 631.3

(51) Int. Cl.
*H02H 3/087*          (2006.01)
*H01H 9/54*          (2006.01)
*H01H 33/59*          (2006.01)
(52) U.S. Cl.
CPC .......... *H01H 9/542* (2013.01); *H01H 33/596* (2013.01); *H02H 3/087* (2013.01)
(58) Field of Classification Search
CPC ........ H01H 9/542; H01H 3/596; H02M 3/087
See application file for complete search history.

(56) References Cited

U.S. PATENT DOCUMENTS 11,948,763 B1 *     4/2024  Capasso ................. H02H 3/087

FOREIGN PATENT DOCUMENTS

DE         102012206326 A1     4/2013
DE             19851186 A1     5/2020
DE         102020208381 A1     1/2022

OTHER PUBLICATIONS

DE 10 2023 113 631.3, Search report dated Feb. 1, 2024, 4 pages—German, 4 pages—English; Certification of Translation dated May 20, 2024, 1 page.

* cited by examiner

*Primary Examiner* — Adolf D Berhane
(74) *Attorney, Agent, or Firm* — Andrew F. Young, ESQ.; Nolte Lackenbach Siegel

(57)          ABSTRACT

A half-bridge circuit arrangement and a method for actuation, has a first, upper circuit breaker, an actuation device associated therewith and a second, lower circuit breaker, an actuation device. The power input of the upper circuit breaker is connected to a first potential of a DC voltage source, the power output of the lower circuit breaker is connected to a second potential of a DC voltage source, and the center tap between the two circuit breakers is connected to an AC voltage output, wherein, after one of the two circuit breakers which is switched on as voltage generation switch for a first voltage generation period has been switched off, the other circuit breaker.

15 Claims, 4 Drawing Sheets

HALF-BRIDGE CIRCUIT ARRANGEMENT AND METHOD FOR ACTUATION

CROSS REFERENCE TO RELATED APPLICATIONS

This application relates to and claims priority to DE 10 2023 113 631.3 filed May 24, 2023, the entire contents of which are incorporated herein fully by reference.

FIGURE SELECTED FOR PUBLICATION

FIG. 5.

BACKGROUND OF THE INVENTION

Field of the Invention

The invention describes a half-bridge circuit arrangement having a first, upper circuit breaker, an actuation device associated therewith, and having a second, lower circuit breaker, an actuation device associated therewith, wherein the power input of the upper circuit breaker is connected to a first potential of a DC voltage source, the power output of the lower circuit breaker is connected to a second potential of a DC voltage source, and the center tap between the two circuit breakers is connected to an AC voltage output.

Description of the Related Art

It is generally known prior art to generate such a half-bridge circuit arrangement for generating an, in particular sinusoidal, output voltage by means of pulse-width-modulated actuation of the circuit breakers. It is also known prior art to wait for a certain, often constant, period, the so-called dead time, after switching off one of the two circuit breakers before switching on the other of the two circuit breakers. The prior art also includes monitoring the respective circuit breakers with regard to the current flowing through them or the voltage dropping across them.

This generally known prior art is basically disclosed in DE 198 51 186 A1. The document discloses an integrated circuit with interface functions between the controller and the potential isolation of a converter, which is suitable for actuating semiconductor switches with one of the functions selector, switch-on delay, operating voltage monitoring, clock generation, error processing and storage, DC/DC converter actuation and driver for several internal designs containing IGBT or MOSFET switches.

ASPECTS AND OBJECTS OF THE INVENTION

At least one of the objects of the present invention is to provide an improvement over the related art.

The invention is based on the object of further developing the known methods for actuating a half-bridge circuit arrangement and said half-bridge circuit arrangement.

This object is achieved according to the invention by a method for actuating a half-bridge circuit arrangement having a first, upper circuit breaker, an actuation device associated therewith and having a second, lower circuit breaker, an actuation device associated therewith, wherein the power input of the upper circuit breaker is connected to a first potential of a DC voltage source, the power output of the lower circuit breaker is connected to a second potential of a DC voltage source, and the center tap between the two circuit breakers is connected to an AC voltage output, wherein, after one of the two circuit breakers which is switched on as voltage generation switch for a first voltage generation period has been switched off, the other circuit breaker, which is then operated as a measuring switch, is switched on for a measuring period, during this measuring period the current is determined by means of the measuring switch and, preferably immediately, after the current has been determined, the measuring switch is switched off again and then the voltage generation switch is only switched on again for a second voltage generation period if no current has flowed via the measuring switch during the measuring period.

It may be advantageous if a dead time is waited between switching off the voltage generation switch and switching on the measuring switch.

It may also be advantageous if the measuring switch is switched on at the same time as the voltage generation switch is switched off or immediately after the voltage generation switch is switched off.

It may be preferable if the voltage generation switch is actuated in a pulse-width-modulated manner in order to generate a defined ideal, preferably sinusoidal, voltage curve at the AC voltage output. In this case, it may also be preferable if the measuring switch is switched on each time a circuit breaker which is operated as a voltage generation switch is switched off. Furthermore, it may be preferable if the upper circuit breaker generates a positive ideal voltage curve. It may also be preferable if the lower circuit breaker generates a negative ideal voltage curve.

It may be advantageous if a circuit breaker which is operated as a measuring switch is switched on using an adapted gate series resistor value.

It may also be advantageous if a circuit breaker which is operated as a measuring switch is switched off on using an adapted gate series resistor value.

The object is furthermore achieved by a half-bridge circuit arrangement having a first, upper circuit breaker, an actuation device associated therewith, and having a second, lower circuit breaker, an actuation device associated therewith, wherein the power input of the upper circuit breaker is connected to a first potential of a DC voltage source, the power output of the lower circuit breaker is connected to a second potential of a DC voltage source, and the center tap between the two circuit breakers is connected to an AC voltage output, wherein the respective actuation device is designed to carry out the method mentioned above.

It may be preferred in this case if the circuit breaker is in the form of a power semiconductor component or of a group of power semiconductor components connected in parallel, wherein the respective power semiconductor component is in the form of an IGBT or a MOSFET, in particular of a MOSFET with a high band gap.

It may be advantageous if the circuit breakers form a two-level bridge circuit. Alternatively, it may be advantageous for a circuit breaker to be formed as part of an upper or lower partial branch of a three-level or multi-level bridge circuit.

It may be preferred in principle if the respective actuation device comprises a first actuation voltage source having an assigned first gate series resistor for switching on the circuit breaker which is operated as a voltage generation switch, a second actuation voltage source having an assigned second gate series resistor for switching off the circuit breaker which is operated as a voltage generation switch, and a third actuation voltage source having an assigned third gate series resistor for switching on or switching off the circuit breaker which is operated as a measuring switch.

Here, it may be advantageous if the third actuation voltage source has a voltage value which is different in terms of absolute value and is preferably lower than the respective first or second actuation voltage source of the same sign.

Of course, unless this is explicitly excluded or excluded per se or contradicts the concept of the invention, the features mentioned in the singular in each case or groups of features can be present several times in the half-bridge circuit arrangement according to the invention.

It goes without saying that the various configurations of the invention, regardless of whether they are mentioned in connection with the half-bridge circuit arrangement or with the methods, can be realized individually or in any combinations in order to achieve improvements. In particular, the features mentioned and explained above and hereinafter are able to be used not only in the combinations indicated, but also in other combinations or by themselves, without departing from the scope of the present invention.

Further explanations of the invention, advantageous details and features are evident from the following description of the exemplary embodiments of the invention that are illustrated schematically in FIGS. 1 to 5, or from respective parts thereof.

The above and other aspects, features, objects, and advantages of the present invention will become apparent from the following description read in conjunction with the accompanying drawings for exemplary but nonlimiting embodiments, in which like reference numerals designate the same elements.

DETAILED DESCRIPTION OF THE PREFERRED EMBODIMENTS

Figure 1:
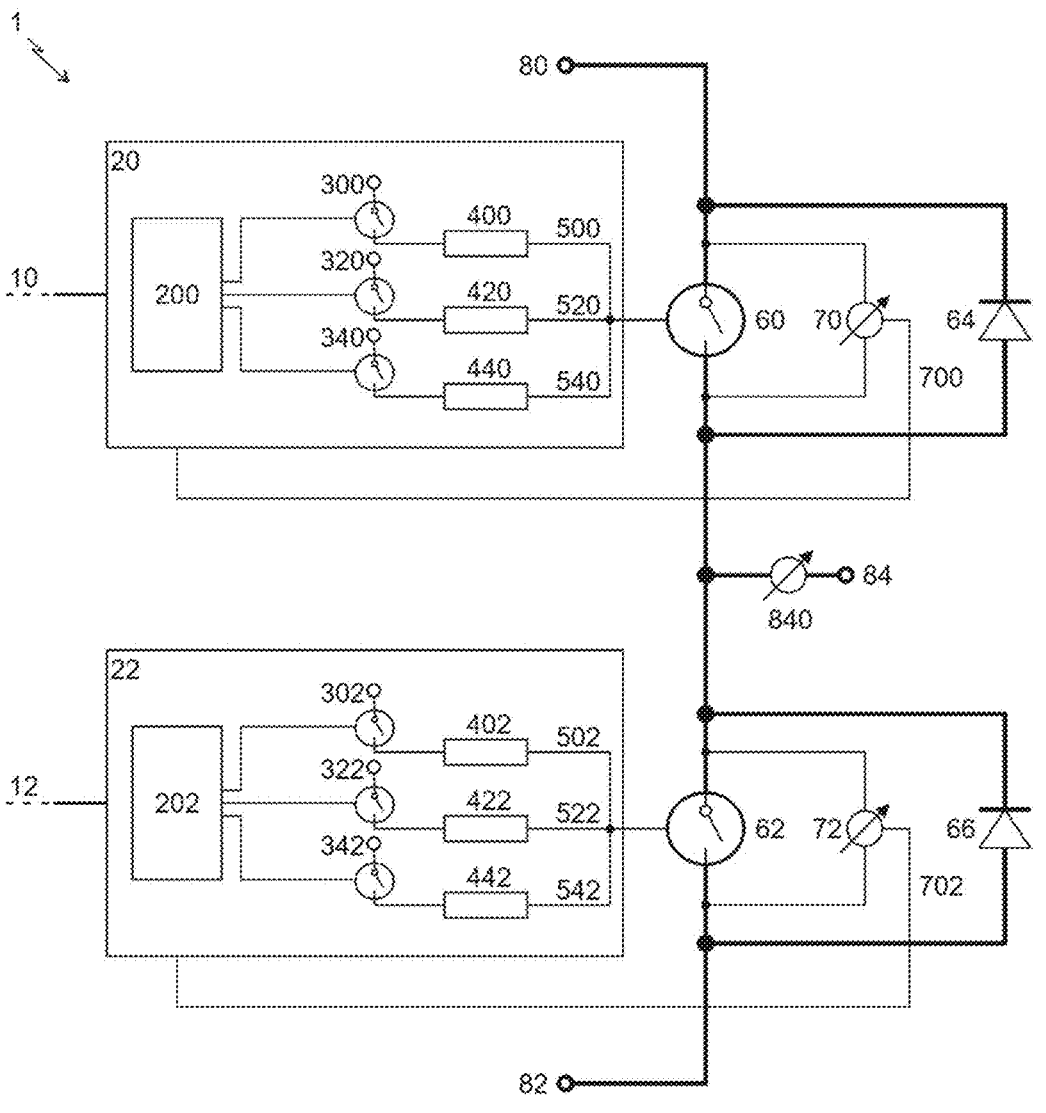
FIG. 1 shows a first embodiment of a half-bridge circuit arrangement according to the invention having a first embodiment of actuation devices according to the invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' or 'bond' or and similar terms do not necessarily denote direct and immediate connections, but also include connections through intermediate elements or devices. For purposes of convenience and clarity only, directional (up/down etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

FIG. 1 shows an embodiment of a half-bridge circuit arrangement 1 according to the invention. Said half-bridge circuit arrangement comprises two circuit breakers 60, 62 that are connected in series, wherein the first, upper circuit breaker 60 is connected to a first DC voltage connection 80 of a DC voltage source, while the second, lower circuit breaker 62 is connected to a second DC voltage connection 82 of a DC voltage source. An alternating potential results at the center tap, the AC voltage connection 84, between the two circuit breakers 60, 62 during operation. In this case, at the AC voltage output, a current sensor 840 is used to determine the intensity and direction of flow of the current flowing through the AC voltage output 84 during operation.

The DC voltage source is formed here by the DC link of a power circuit, which can still have a plurality of similar half-bridge circuit arrangements 1 in a manner customary in the art.

Figure 2:
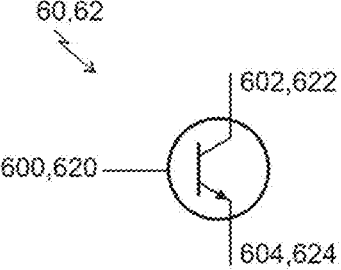
FIG. 2 shows an embodiment of a circuit breaker.

As shown in FIG. 2, each of these circuit breakers 60, 62 has a load input 602, 622, a load output 604, 624 and a control input 600, 620. A first diode 64 is connected in antiparallel with the first circuit breaker 62, while a second diode 66 is connected in antiparallel with the second switch 62.

The respective circuit breaker 60, 62 may be in the form of an IGBT or a plurality of IGBTs connected in parallel. The collector connection of the respective IGBT then forms the load input, the emitter connection forms the load output and the gate connection forms the control input. Alternatively, the respective circuit breaker 60, 62 can also be in the form of a MOSFET, preferably a MOSFET with a high band gap, that is to say a SiC or GaN MOSFET, or in the form of a parallel circuit composed of a plurality of MOSFETs. Then the drain connection forms the load input, the source connection forms the load output and the gate connection forms the control connection. The two diodes 64, 66 can also be in the form of a parallel circuit composed of a plurality of diodes.

The half-bridge circuit arrangement 1 illustrated here is in the form of a two-level bridge circuit, but may also accordingly be in the form of a multi-level bridge circuit.

Each of the two circuit breakers 60, 62 has a respectively assigned actuation device 20, 22 for it, which is connected to the control input 600, 602 thereof. Both actuation devices 20, 22 are of identical design here purely by way of example.

Furthermore, each circuit breaker 60, 62 has an assigned measuring device 70, 72, which either measures the voltage drop across the circuit breaker 60, 62 or the current through the circuit breaker 60, 62. The current can also be determined indirectly from the voltage drop.

The respective actuation device 20, 22 itself comprises a circuit arrangement 200, 202 which provides an input for a control signal 10, 12 as well as an input for the signal from the measuring device 70, 72. The control signal 10, 12 is in this case sent by a superordinate control device in a manner customary in the art and contains the switching commands for the respective assigned circuit breaker 60, 62.

In addition to the respective input for a sensor signal 700, 702 from the respective assigned measuring device 70, 72, further inputs for sensor signals are possible, which then represent for example the temperature of the circuit breaker 60, 62 and are also processed in the circuit arrangement.

The respective circuit arrangement 200, 202 furthermore comprises actuation logic with three outputs, which are each connected to a switching element fed from an actuation voltage source 300, 302, 320, 322, 340, 342. The respective switching element comprises an input which is connected to a switching voltage source, and an output which is connected via an assigned gate series resistor 400, 402, 420, 422 to the control input 600, 620 of the assigned circuit breaker 60, 62. By way of example, the actuation voltage source 300, 302 which feeds the respective first switching element has a voltage of +15V, the actuation voltage source 320, 322 which feeds the respective second switching element has a voltage of −8V and the actuation voltage source 340, 342 which feeds the respective third switching element has a voltage of −5V.

The respective actuation patterns 30, 32 represent a binary idealization of the real voltage curves of the actuation signals 500, 502, 520, 522, 540, 542 which are applied to the control inputs 600, 602 of the respective circuit breaker 60, 62 during operation.

The respective actuation device 20, 22, like the circuit arrangement 200, 202 thereof, can also have a plurality of further function blocks, in particular ones that are conventional in the art in driver circuits for circuit breakers 60, 62. In principle, single or multiple function blocks, in particular the entire circuit arrangement 200, 202, can be wholly or partly in the form of integrated circuits.

Figure 3:
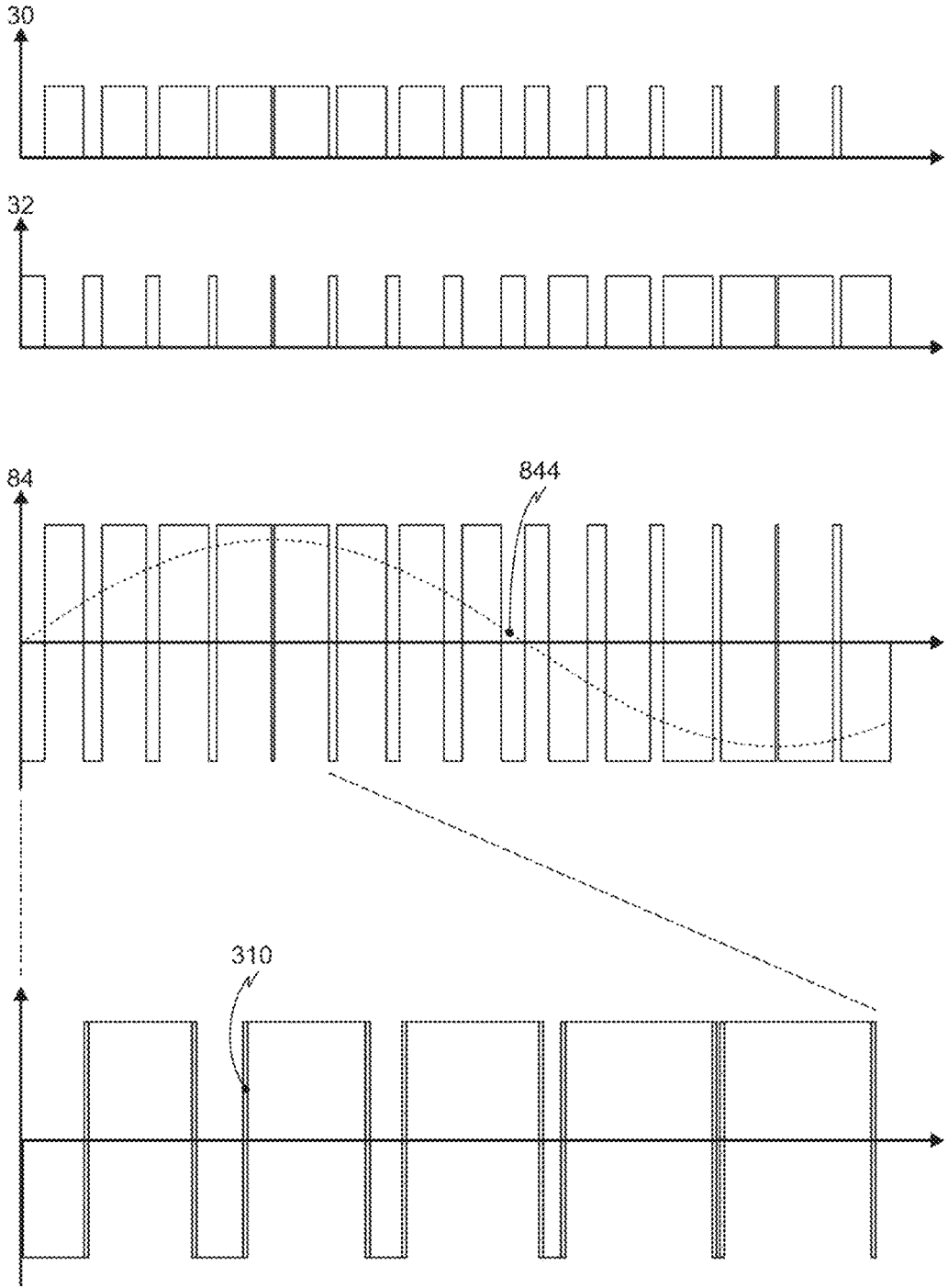
FIG. 3 shows a first embodiment of a method for actuating a half-bridge circuit arrangement according to the prior art.

FIG. 3 shows a first embodiment of a method for actuating a half-bridge circuit arrangement 1 according to the prior art. From top to bottom, the first graph shows the actuation pattern 30 of the first circuit breaker 60, the second graph shows the actuation pattern 32 of the second circuit breaker 62, the third graph shows the sinusoidal target output voltage 844 of the half-bridge circuit arrangement, as well as the idealized pulse width modulation of the first and second circuit breaker 60, 62. The fourth graph shows a section of the third graph spread out over time.

In this embodiment of the method, although a positive target output voltage 844 is to be generated, the lower circuit breaker 62 is first switched on. This first pulse of the lower circuit breaker 62 is followed by a pulse of the upper circuit breaker 60. This alternating switching on and off continues until the end of the first half-wave, as the positive target output voltage 844. This switching pattern is a typical, well-known pulse-width-modulated switching pattern for the half-bridge circuit arrangement 1. As shown in the fourth graph, it is customary in the art to wait a usually constant period of time 310, the so-called dead time, between the switching operations of two circuit breakers 60, 62 in order to prevent both circuit breakers 60, 62 being switched on simultaneously in real operation, which is what is known as a bridge short-circuit.

The negative half-wave, in which the circuit breakers 60, 62 are actuated in the reverse direction, adjoins the positive half-wave.

This pulse-width-modulated method of always switching the two circuit breakers 60, 62 alternately leads, after smoothing, approximately to the desired sinusoidal target output voltage 844 at the AC voltage output 84, cf. FIG. 1.

Figure 4:
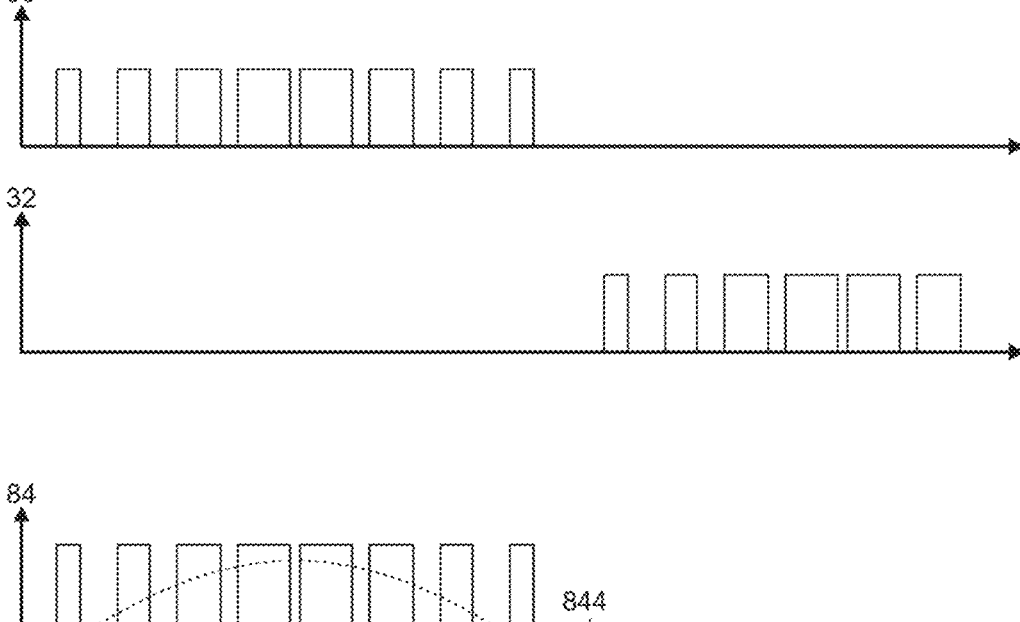
FIG. 4 shows a second embodiment of a method for actuating a half-bridge circuit arrangement according to the prior art.

FIG. 4 shows a second embodiment of a method for actuating a half-bridge circuit arrangement 1 according to the prior art.

In this embodiment of the method, only the first circuit breaker 60 is switched on and off in a pulse-width-modulated manner for the positive half-wave, while the second circuit breaker 62 is permanently switched off. The negative half-wave adjoins the positive half-wave, only the second circuit breaker 62 is switched on and off in a pulse-width-modulated manner, while the first circuit breaker 60 is switched off permanently.

This pulse-width-modulated method for the two circuit breakers 60, 62 also leads, after smoothing, approximately to the desired sinusoidal target output voltage 844 at the AC voltage output 84, cf. FIG. 1.

Figure 5:
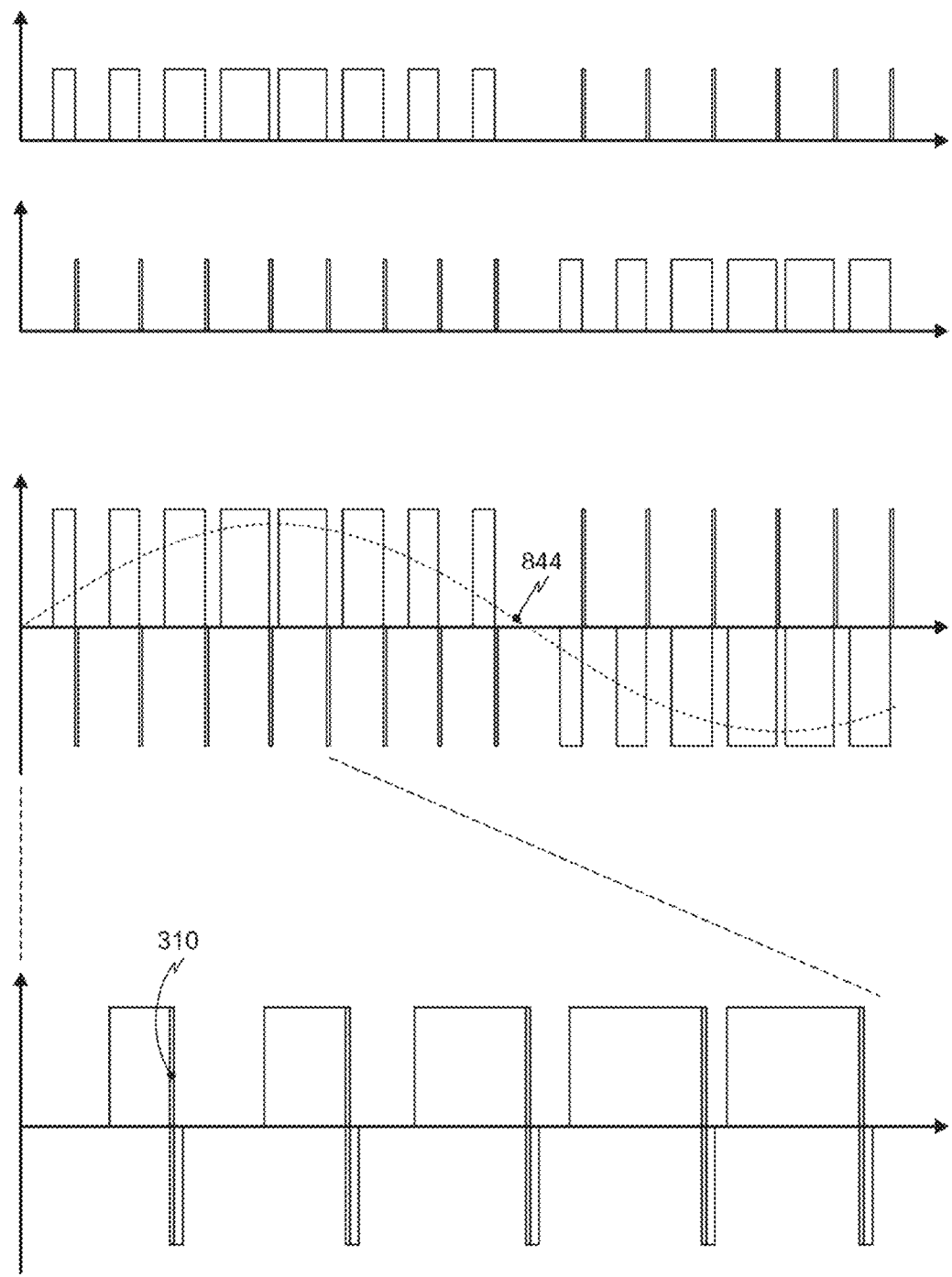
FIG. 5 shows an inventive embodiment of a method for actuating a half-bridge circuit arrangement.

FIG. 5 shows an inventive embodiment of a method for actuating a half-bridge circuit arrangement 1. The starting point for this is the second method mentioned above according to the prior art.

For the positive half-wave of the target output voltage 844, in this case the first circuit breaker 60 which is thus operated as a voltage generation switch is switched in a pulse-width-modulated manner. The second circuit breaker 62, which is then operated as a measuring switch is switched on after each time said circuit breaker 60 which is operated as a voltage generation switch is switched off. Of course, said, in this case now negative, voltage also contributes to the total voltage, which is why the pattern of the pulse-width control of the first circuit breaker 60 is adapted to this, as a result of which larger time intervals at which the first circuit breaker 60 is switched on arise compared to the prior art.

After each time the voltage generation switch is switched off, that is to say during the positive half-wave of the first circuit breaker 60, a dead time is waited before switching on the measuring switch, that is to say the lower circuit breaker 62. Since the switched-on period of the measuring switch is very short, said dead time may also be omitted.

Therefore, essentially only the upper circuit breaker 60 generates the positive ideal voltage curve at the AC voltage output 84, cf. FIG. 1. In principle, the negative half-wave is generated in an identical manner, but accompanied by a change of functions between the voltage generation switch and the measuring switch. Overall, after smoothing, approximately the desired sinusoidal target output voltage 844 is therefore applied to the AC voltage output 84.

In principle, in the context of the method according to the invention, the voltage generation switch is switched on for a first voltage generation period based on the pulse width modulation. As soon as it is switched off again, the measuring switch is switched on for a measuring period. During said measuring period, the current is determined by means of the measuring switch and the measuring switch is switched off again after the current has been determined. The voltage generation switch is then only switched on again for a second voltage generation period if no current has flowed through the measuring switch during the measuring period. Both a possible dead time as well as the respective measuring period are preferably constant during the execution of the method. However, in particular the measuring period can be determined dynamically. In this case, the measuring switch can be switched off immediately after the current has been determined thereby.

It is particularly preferred if the circuit breaker 60, 62 is switched off during operation as a measuring switch with a lower voltage than would be done during operation as a voltage generation switch. Purely by way of example, therefore, the voltage generation switch can be switched on with a voltage of +15V, fed from the first actuation voltage source 300, 302, and switched off with a voltage of −8V, fed from the second actuation voltage source 320, 322, while the same switch is switched on during operation as a measuring switch with a voltage of +15V, fed from the first actuation voltage source 300, 302, and switched off with a voltage of −5V, fed from the third actuation voltage source 340, 342. In addition, the respective gate series resistors 420, 422, 440, 442 can also differ from one another.

Also, the inventors intend that only those claims which use the specific and exact phrase "means for" are intended to be interpreted under 35 USC 112. The structure, device, and arrangement herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure covers modifications and variations of this disclosure provided they come within the scope of the appended claims and their equivalents.

What is claimed is:

1. A method, for actuating a half-bridge circuit arrangement (1), comprising the steps of:

providing said half-bridge circuit arrangement (1) having a first, upper circuit breaker (60), an actuation device (20) associated therewith and having a second, lower circuit breaker (62), an actuation device (22) associated therewith;

wherein, a power input (602) of the upper circuit breaker (60) is connected to a first potential (80) of a DC voltage source, a power output (624) of the lower circuit breaker (62) is connected to a second potential (82) of a DC voltage source, and a center tap between the two circuit breakers (60, 62) is connected to an AC voltage output (84);

wherein, after one of the two circuit breakers (60, 62) which is switched on as voltage generation switch for a first voltage generation period has been switched off, the other circuit breaker (60, 62), which is then operated as a measuring switch and is switched on for a measuring period; and switching said measuring switch on during said measuring period;

determining the current, during the measuring period, by means of the measuring switch; and immediately, after the current has been determined, switching off the measuring switch and then the voltage generation switch is only switched on again for a second voltage generation period if no current has flowed via the measuring switch during the measuring period.

2. The method, as claimed in claim 1, wherein:

a dead time is waited between switching off the voltage generation switch and switching on the measuring switch.

3. The method, as claimed in claim 1, wherein:

the measuring switch is switched on at the same time as the voltage generation switch is switched off or immediately after the voltage generation switch is switched off.

4. The method, as claimed in claim 3, wherein:

the voltage generation switch is actuated in a pulse-width-modulated manner in order to generate a defined ideal, preferably sinusoidal, voltage curve (844) at the AC voltage output (84).

5. The method, as claimed in claim 4, wherein:

the measuring switch is switched on after each time a circuit breaker which is operated as a voltage generation switch is switched off.

6. The method, as claimed in claim 5, wherein:

the upper circuit breaker (60) generates a positive ideal voltage curve.

7. The method, as claimed in claim 6, wherein:

the lower circuit breaker (62) generates a negative ideal voltage curve.

8. The method, as claimed in claim 7, wherein:

a circuit breaker (60, 62) which is operated as a measuring switch is switched on using an adapted gate series resistor value (420, 422).

9. The method, as claimed in claim 8, wherein:

a circuit breaker which is operated as a measuring switch is switched off using an adapted gate series resistor value (420, 422).

10. A half-bridge circuit arrangement (1), comprising:

a first, upper circuit breaker (60), an first actuation device (20) associated therewith, and a second, lower circuit breaker (62), a second actuation device (22) associated therewith, wherein a power input (602) of the upper circuit breaker (60) is connected to a first potential (80) of a DC voltage source, a power output (624) of the lower circuit breaker (62) is connected to a second potential (84) of a DC voltage source, and a center tap between the two circuit breakers (60, 62) is connected to said AC voltage output (84); and wherein the respective actuation devices (20, 22) are designed to carry out the method as claimed in claim 1.

11. The half-bridge circuit arrangement (1), as claimed in claim 10, wherein:

the circuit breaker (60, 62) is in the form of a power semiconductor component or of a group of power semiconductor components connected in parallel, wherein the respective power semiconductor component is in the form of an IGBT or a MOSFET, in particular of a MOSFET with a high band gap.

12. The half-bridge circuit arrangement (1), as claimed in claim 11, wherein:

the circuit breakers (60, 62) form a two-level bridge circuit.

13. The half-bridge circuit arrangement (1), as claimed in claim 11, wherein:

a circuit breaker (60, 62) is formed as part of an upper or lower partial branch of a three-level or multi-level bridge circuit.

14. The half-bridge circuit arrangement (1), as claimed in claim 13, wherein:

the respective actuation device (20, 22) further comprises:

a first actuation voltage source (300, 302) having an assigned first gate series resistor (400, 402) for switching on the circuit breaker (60, 62) which is operated as a voltage generation switch, a second actuation voltage source (340, 342) having an assigned second gate series resistor (440, 442) for switching off the circuit breaker (60, 62) which is operated as a voltage generation switch, and a third actuation voltage source (320, 322) having an assigned third gate series resistor (420, 422) for switching on or switching off the circuit breaker (60, 62) which is operated as a measuring switch.

15. The half-bridge circuit arrangement (1), as claimed in claim 14, wherein:

the third actuation voltage source (320, 322) has a voltage value which is different in terms of absolute value and is preferably lower than the respective first or second actuation voltage source (300, 302, 340, 342) of the same sign.

* * * * *